United States Patent [19]

Rogers et al.

[11] 3,903,504

[45] Sept. 2, 1975

[54] BINARY PHASE DIGITAL DECODING SYSTEM

[75] Inventors: R. Timothy Rogers, Wayne; Fred Miller, Maple Shade, both of N.J.

[73] Assignee: The Singer Company, Little Falls, N.J.

[22] Filed: Mar. 20, 1974

[21] Appl. No.: 452,802

[52] U.S. Cl......... 340/147 SY; 178/69.5 R; 340/170

[51] Int. Cl...... H04b 1/16; H04q 1/00; H041 15/04

[58] Field of Search...................... 340/147 SY, 170; 179/15 BS; 178/67, 69.5 R

[56] References Cited

UNITED STATES PATENTS

| | | | |
|---|---|---|---|
| 2,939,914 | 6/1960 | Ingham | 178/67 |
| 3,008,124 | 11/1961 | Warnock | 340/170 |
| 3,401,339 | 9/1968 | Kluever | 178/67 |
| 3,467,777 | 9/1969 | Rumble | 178/67 |
| 3,649,758 | 3/1972 | Clark | 178/69.5 R |
| 3,747,067 | 7/1973 | Fox et al. | 340/147 SY |
| 3,777,062 | 12/1973 | Ogawa | 178/69.5 R |

*Primary Examiner*—Donald J. Yusko
*Attorney, Agent, or Firm*—T. W. Kennedy

[57] ABSTRACT

A digital decoding system is provided which is capable of decoding binary phase modulated digital data streams of arbitrary bit length. The system decodes data signals of either polarity following or preceding a synchronizing signal. The decoder system includes a tri-state signal detector logic circuit which is strobed at a predetermined rate by a high frequency clock, and appropriate registers and associated logic circuitry for storing the resulting binary synchronizing and data signals and for ultimately recovering the digital data. The system also includes logic circuitry for recognizing the synchronizing signal and its polarity.

10 Claims, 7 Drawing Figures

BINARY PHASE DIGITAL DECODING SYSTEM

BACKGROUND OF THE INVENTION

Binary phase modulation has become a major modulation method in recent years for the transmission of digital data. In the practice of binary phase modulation, the polarity of a carrier is reversed as a function of the digital modulating signal, and this reversal has the effect of shifting the phase 180°. A problem inherent in binary phase modulation systems is that, if digital information is to be contained in the phase of the signal, the phase must be determinable with respect to some reference signal. That is, unlike the usual amplitude modulation and frequency modulation systems, the modulation content of the binary phase modulated signal cannot be determined by measurements on isolated portions of the signal alone.

A variety of binary phase digital decoding systems have been devised in the prior art for sensing phase changes in binary phase modulated signals. These prior art decoding systems, for the most part have employed complex analog circuitry, phaselocked loops, and the like. Such prior art systems are relatively complicated and expensive, and are incapable of detecting digital data without the inclusion of wasteful spacer bits and dead time between data words and messages.

The binary phase digital decoding system of the present invention has the advantage of being relatively simple in its concept and construction, and of being capable of decoding binary phase modulated data streams of predetermined bit length preceded by or following appropriate synchronizing signals, without any need for spacer bits or dead time between the data words or messages.

In addition, the proper operation of the decoding system of the invention is unaffected by variations in signal amplitude or frequency, and no constraint is placed on the sequence of data or synchronizing bit patterns. The decoding system of the invention can be used in conjunction with signal frequencies from several hertz to many megahertz. The system, moreover, is insensitive to noise preceding or following data transmission.

As mentioned above, the binary phase decoding system of the invention comprises a tri-state polarity signal detector circuit. The system derives a data clock from the information content of the received binary phase modulation signal. It provides an unambiguous means for detecting positive and negative synchronizing signals, and for decoding positive and negative data bits in any sequence to recover the digital data represented by the transmitted binary phase modulated signal.

DETAILED DESCRIPTION OF THE ILLUSTRATED EMBODIMENT

Figure 1:
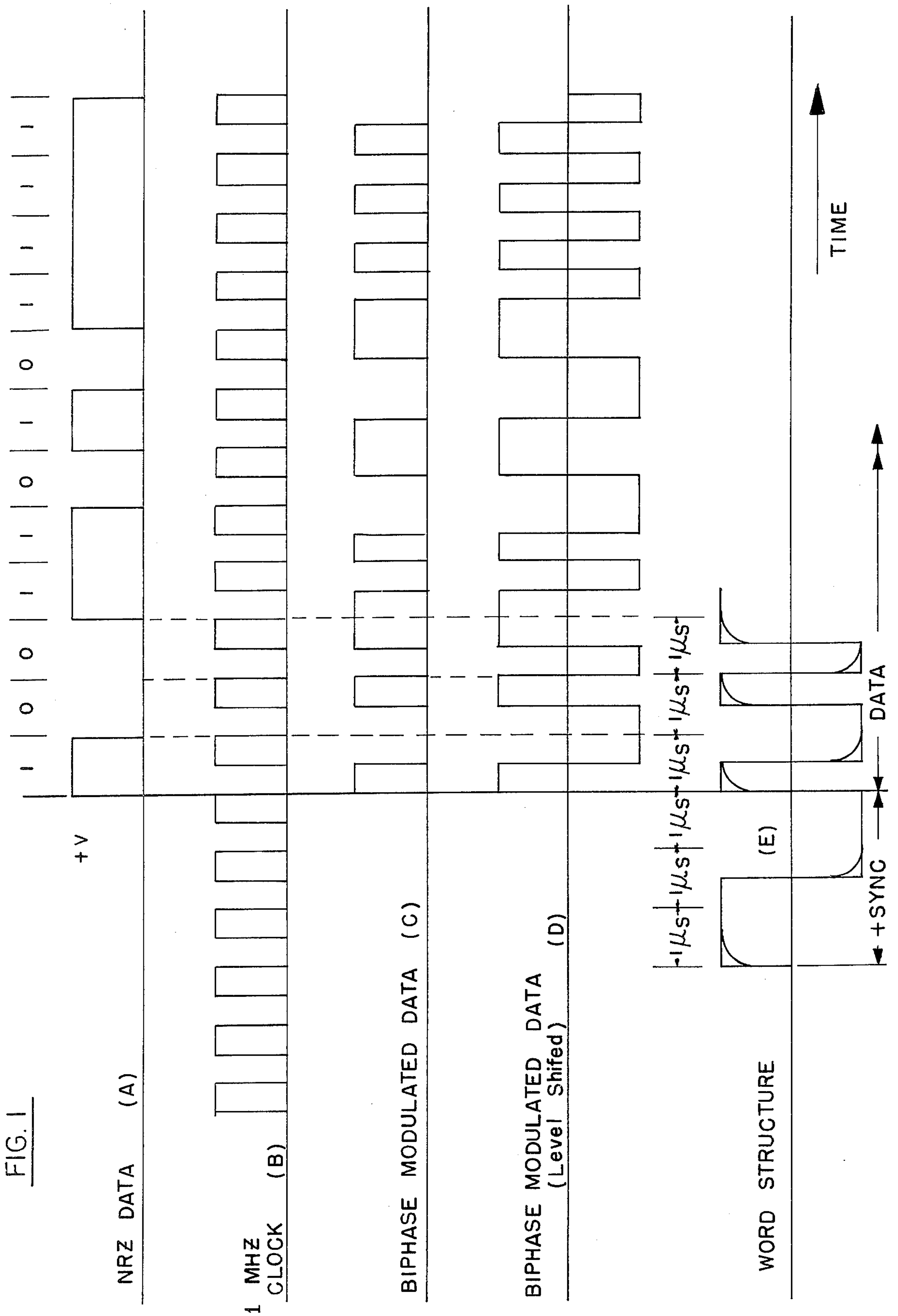
FIG. 1 is a series of curves showing the formation of a binary phase modulated signal for the transmission of digital data.

As shown in FIG. 1, a non-return-to-zero (NRZ) stream of digital data (A), and an appropriate clock signal (B) of, for example, a 1 megahertz (MHz) repetition rate, may be passed through an "exclusive-or" gate to produce binary phase modulated data (C). In the signal of curve (C), a positive pulse followed by a negative pulse represents binary "1", and a negative pulse followed by a positive pulse represents binary "0". Each pulse in curve (C), for example, has a duration of 500 nanoseconds. Regardless of bit sequence, no pulse in curve (C) has a duration longer than 1 microsecond.

For transmission, the signal of curve (C) is level-shifted to represent a series of positive and negative pulses symmetrical about a zero axis (curve (D)). In actual transmissions, the signal of curve (D) usually assumes the waveform of curve (E), in that the leading edges of the signal pulses have a tendency to become rounded. A positive synchronizing signal is also illustrated in curve (E) as preceding the data signal. Each positive synchronizing signal is made up of a positive pulse followed by a negative pulse, and each negative synchronizing signal is made up of a negative pulse followed by a positive pulse. Each pulse of the synchronizing signal has a duration, for example, of 1.5 microseconds, which is greater than the duration of any data pulse, so that the synchronizing signals may be distinguished from the data signals in the decoding system.

Figure 2:
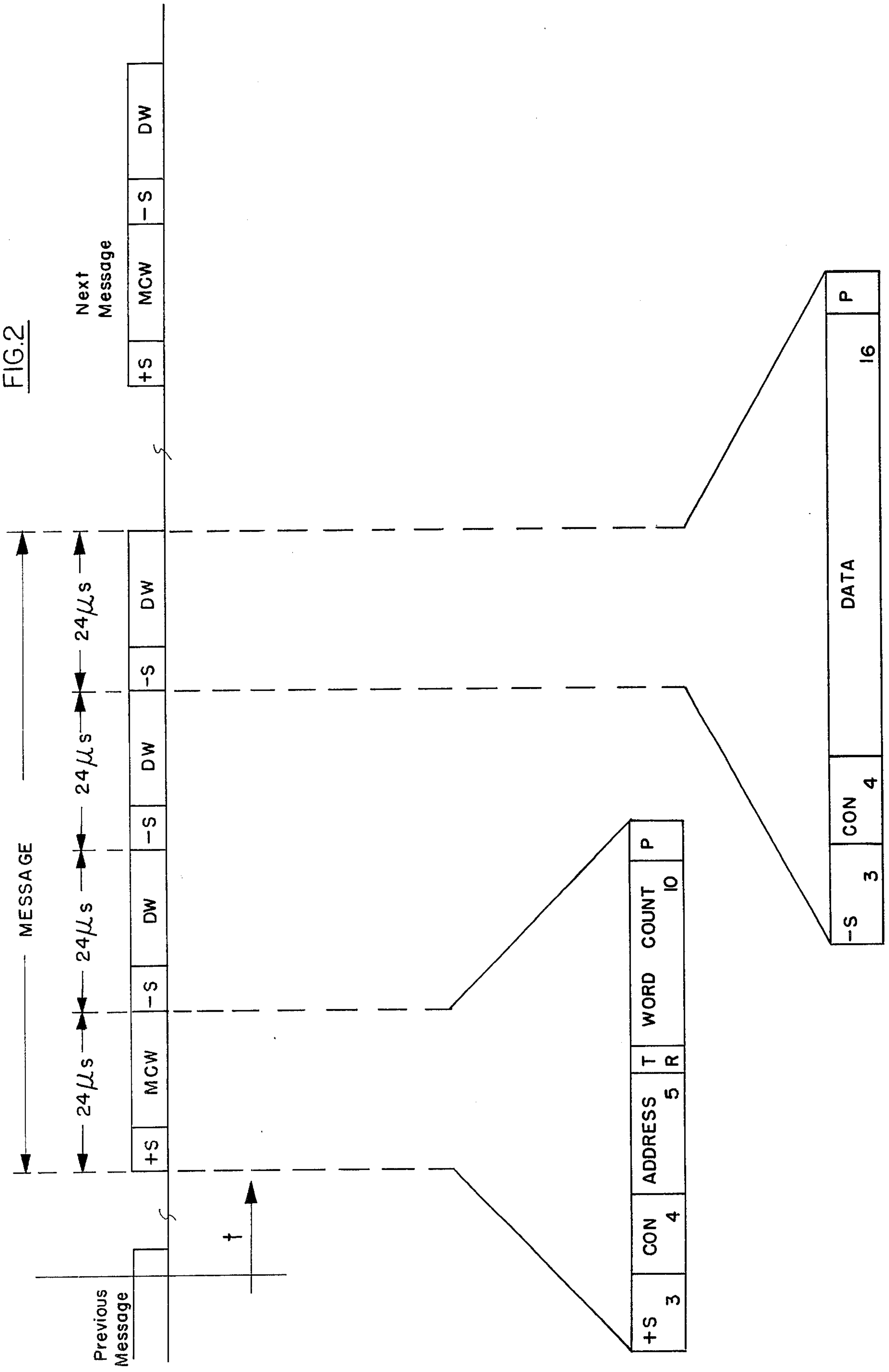
FIG. 2 is a representation of a typical word format used in digital transmission systems.

The actual messages transmitted by the binary phase modulation technique are composed of a series of digital words of arbitrary length, which may have the format shown in FIG. 2. Each message, for example, may be preceded by a positive synchronizing signal (+S) which, in turn, is followed by a message control word (MCW). The message control word is then followed by a series of data words (DW), each of arbitrary bit length, and each preceded by a negative synchronizing system (−S).

Figure 3:
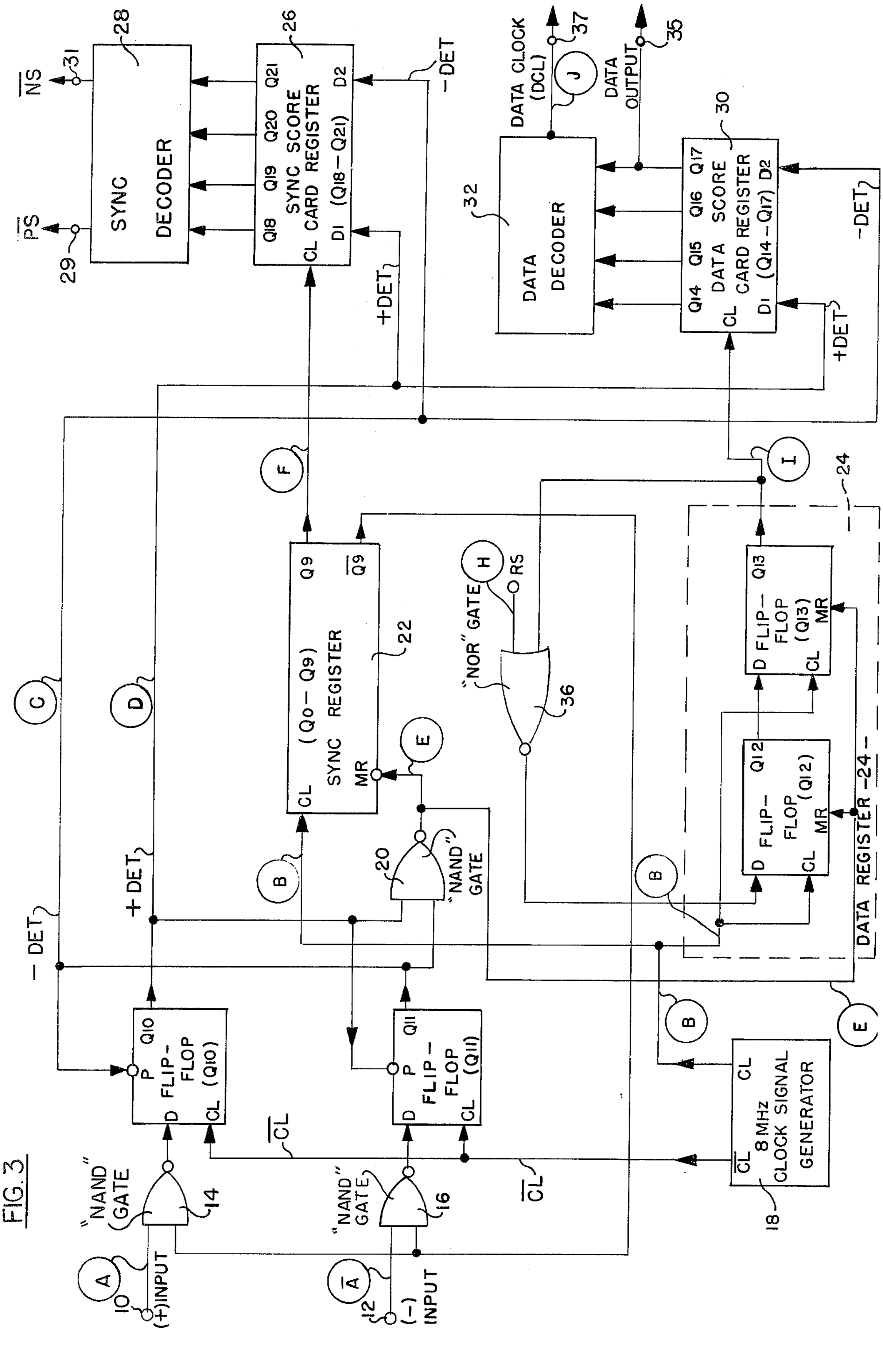
FIG. 3 is a functional block diagram of one embodiment of the binary phase decoder system of the invention.

As shown in FIG. 3, each synchronizing signal may have a length of three bit times. The message control word (MCW), as also illustrated, is composed of a control field (CON) extending through four bit times, an address field extending through five bit times, a transmit/receive bit (T/R), a word count field extending through ten bit times, and a parity bit (P). This is in accordance with known practice.

The data words, also in accordance with known practice, may be made up of a control field (CON) of four bit times, a data field of sixteen bit times, and a parity bit (P). The representations of FIG. 2 are merely typical examples of the word format used in digital transmission systems, and represent data which may be decoded by the decoder system of the invention.

Figure 4A:
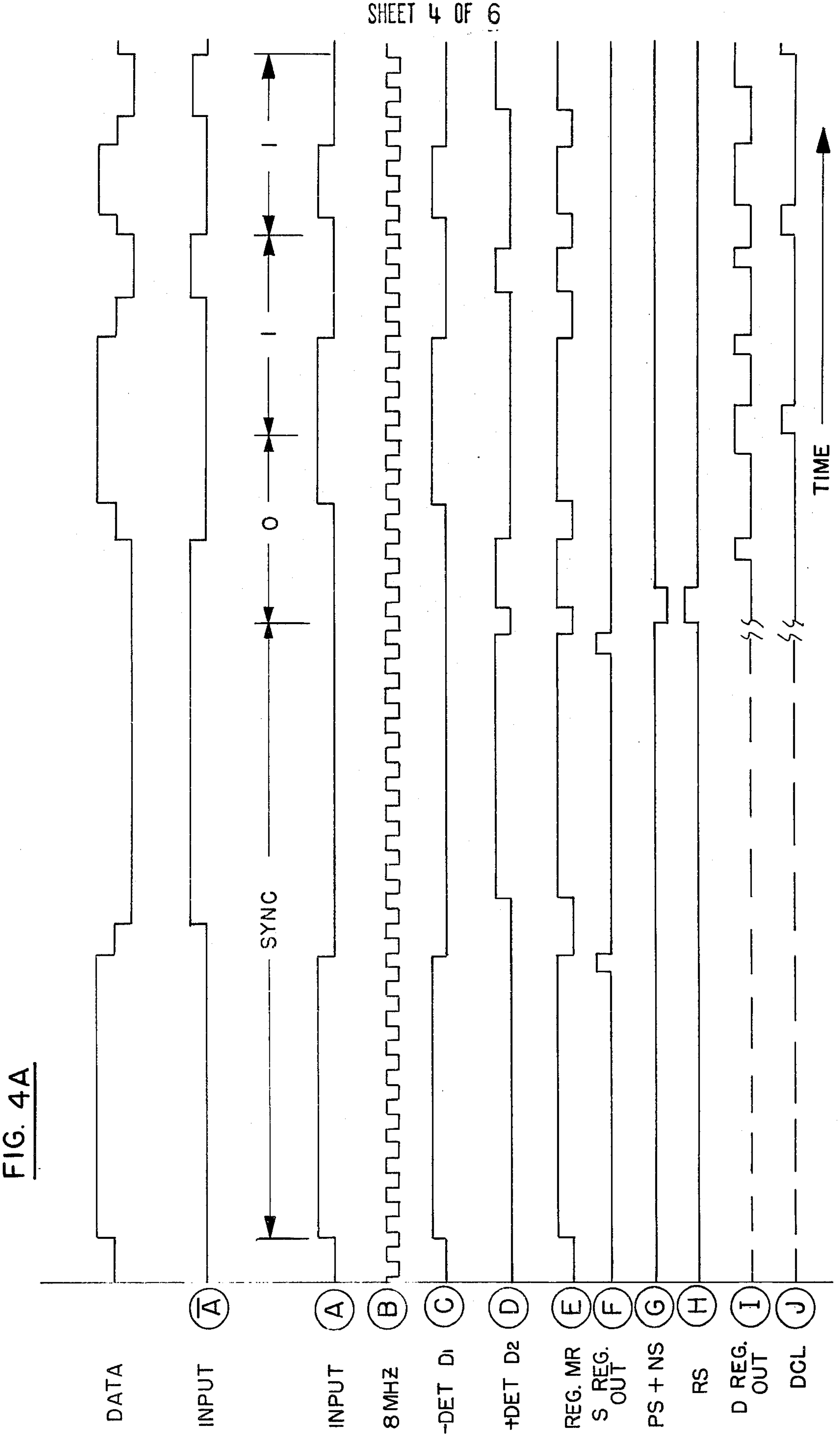
FIGS. 4A, 4B and 4C are a series of curves showing waveforms which appear at different points in the system of FIGS. 3 and 5, and which are useful in explaining the operation of the illustrated embodiment of the invention.

The binary phase modulated signal of the curve (E) of FIG. 1, is detected and then suitably processed and filtered, for example, so that it assumes a rectangular waveform such as shown in the "data" waveform of FIG. 4A, and it is applied with a first polarity or phase ($\bar{A}$) to input terminal 10 of FIG. 3, and with opposite polarity or phase (A) to input terminal 12. The input terminal 10 is connected to a "nand" gate 14, and the input terminal 12 is connected to a nand gate 16. The nand gate 14 is connected to the D input terminal of the flip-flop Q10, and the nand gate 16 is connected to the D input terminal of a flip-flop Q11.

A clock signal generator 18 is provided which generates, for example, an 8 megahertz clock (CL) such as represented by the waveform B of FIG. 4A.

The Q output terminal of the flip-flop Q10, and the Q output terminal of the flip-flop Q11 are connected to a nand gate 20 which, in turn, is connected to the reset and clear input terminal (MR) of a 10 bit synchronizing signal detector register 22, which is made up of flip-flops Q0-Q9. The nand gate 20 is also connected to the reset and clear input terminal (MR) of a data detector register 24 which is made up of two flip-flops Q12 and Q13. The clock pulses (CL) from the signal generator 18 are applied to the clock input terminals of both the synchronizing signal detector register 22 and data detector register 24.

The Q output terminal Q9 of the synchronizing signal detector register 22 supplies clock pulses (waveform F of FIG. 4A) to a four bit synchronizing signal scorecard register 26, which is made up of four flip-flops Q18-Q21. The Q output terminals of the flip-flops in the scorecard register 26 are connected to an appropriate synchronizing signal decoder 28 from which are derived the complements of the positive synchronizing signal (PS) and of the negative synchronizing signal (NS).

The data detector register 24 supplies clock pulses (waveform I of FIG. 4A) to a four bit data scorecard register 30 which is made up of four flip-flops Q14-Q17. The set output terminals of the flip-flops Q14-Q17 are connected to an appropriate data decoder 32 from which the data clock (DCL) is derived (waveform J of FIG. 4A). The data output is obtained from the Q17 output of the register 30. The output of the data detector 24 register is also applied to a "nor" gate 36, whose output is connected back to the "D" input terminal of flip-flop Q12 in the data register. The other input to the nor gate is the term (RS = PS + NS).

The Q output terminal of the flip-flop Q11 is connected back to the preset input terminal (P) of flip-flop Q10, and the Q output terminal of the flip-flop Q10 is connected back to the preset input terminal (P) of the flip-flop Q11. The Q output terminal of flip-flop Q10 is also connected to the D1 input terminals of the scorecard registers 26 and 30, and the Q output terminal of the flip-flop Q11 is also connected to the D2 input terminals of the registers. The Q output terminal $\overline{Q9}$ of the sync register 22 is connected back to the nand gates 14 and 16.

The decoding system of FIG. 3, as will be described, is an asynchronous sampling system which effectively samples the input introduced to the terminals 10 and 12, and which compares the incoming digital data signal against previously stored bit patterns to make the desired phase determinations so as to decode the information. The system does not use samples derived around the zero cross-over points of the incoming data signal, because such samples are not reliable. As will become evident as the description proceeds, the decoding system of the invention is capable of decoding any combination of digital one's or zero's, and it does not respond to any particular bit pattern. The decoding system of the invention is also capable of detecting the positive or negative synchronizing signals which precede or follow any data or control words. The system is unresponsive to varying signal amplitudes, and it is relatively insensitive to noise.

The input gates 14 and 16, the input flip-flops Q10 and Q11, and the gate 20, form a tri-state polarity signal detector which becomes effective to detect data only when the proper synchronizing signal pattern has been received and recognized. When both the plus input and minus input applied to the input terminals 10 and 12 are low, indicating that there is no incoming signal on the line, this condition is clocked at the 8 megahertz rate by the $\overline{C}$L signal from the clock generator 18. This clock signal is applied to both input flip-flops Q10 and Q11, so that both input flip-flops are set under these conditions to cause the output of gate 20 to change its state and reset and clear both the ten bit sync register 22 and the two bit data register 24. Therefore, prior to the receipt of a signal on the line, both these registers are in a cleared state.

When an incoming signal is received, it is introduced as waveform (A) (FIG. 4A) to the input terminal 10, and as input (A) to the input terminal 12. When that occurs, either the plus input or the negative input will go high, and the next clock pulses will strobe the input states into the flip-flops Q10 and Q11. Then, either the Q10 or Q11 signal output will go low, removing the reset from both the synchronizing and data detector registers 22 and 24. Now, as long as the input state remains unchanged, a logic 1 will propagate down the ten bit sync register 22 with every clock pulse CL (waveform (B) of FIG. 4A) from the clock generator 18.

In order for a logic 1 to propagate to the output Q9 of the synchronizing signal detector register 22, the input flip-flops Q10 and Q11 must remain unchanged for at least ten strobe clock pulses. If the input changes state before that time, the reset MR will be applied to the register 22 terminating the progress of the logic 1 in that register, and returning the register to its cleared state. This occurs, should either the high input return to a low state, or should both inputs change state together.

The cross-coupling of the input flip-flops Q10 and Q11 prevents both flip-flops from changing state together. Both outputs of the flip-flops have to return to a 1 state for at least one strobe clock pulse interval before a new input condition can be clocked in. This guarantees that a one clock period reset will be applied to the synchronizing signal and data detector registers 22 and 24 during every transition of the incoming data, so that synchronizing signals may be distinguished from data signals without the need for the introduction of spacer bits or dead time into the data stream.

For a synchronizing signal to be recognized, the input flip-flops Q10 and Q11 must remain unchanged in an active state for at least 1.25 microseconds, and then the input flip-flops must change state and remain unchanged in the opposite active state for at least another 1.25 microseconds. Thus, should a positive synchronizing signal be received, such as shown in the waveform (A) of FIG. 4A, it is composed of a positive pulse followed by a negative pulse, with the two pulses being separated from one another by one 8 MHz clock time (CL). Each of the two synchronizing signal pulses will cause the synchronizing signal detector register 22 to develop an output pulse (curve (F) of FIG. 4A).

Each time the synchronizing signal detector register 22 generates an output pulse, the input gates 14 and 16 are disabled, and the input flip-flops Q10 and Q11 are both set by the next strobe clock pulse ($\overline{CL}$) to enable the gate 20 so as to reset both registers 22 and 24. Also, each output pulse from the synchronizing signal detector register 22 clocks the state of the synchronizing signal scorecard register 26. If a valid positive or negative synchronizing signal is present, the synchronizing signal scorecard register 26 will apply appropriate input to the synchronizing signal decoder 28 so that a positive synchronizing signal (PS) or a negative synchronizing signal (NS) may be detected.

As described above in conjunction with FIG. 2, in a typical digital communication system, a message control word (MCW) is decoded after a positive synchronizing signal has been received and recognized, and a data word (DW) is decoded after a negative synchronizing signal has been received and recognized. The decode patterns for the positive synchronizing signal are shown in FIG. 4B, and for the negative synchronizing signal are shown in FIG. 4C.

Figure 4B:
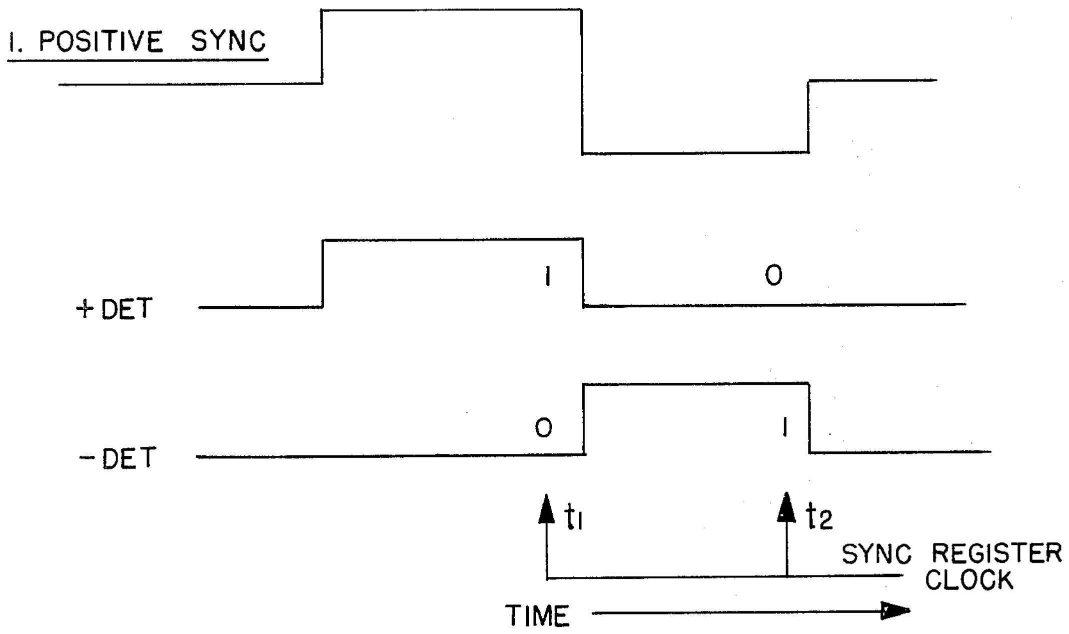
Figure 4C:
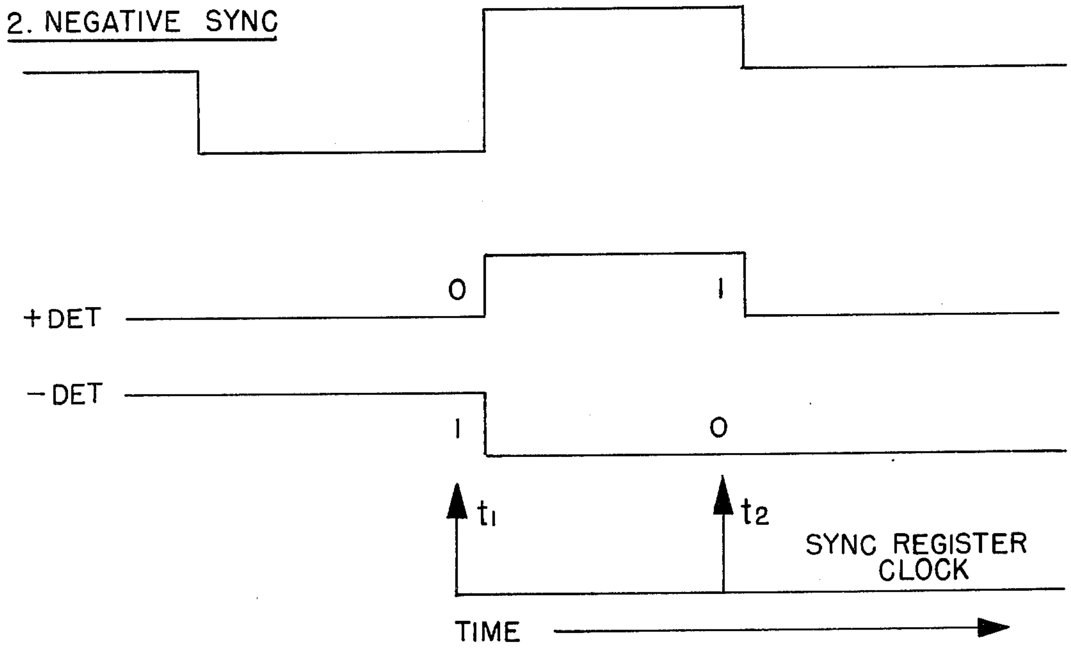

The waveforms of FIG. 4B provide a flip-flop state $\overline{Q18}$, Q19, Q20, $\overline{Q21}$ in the synchronizing signal scorecard register 26 for positive synchronizing; and a flip-flop pattern Q18, $\overline{Q19}$, $\overline{Q20}$, Q21 for a negative synchronizing signal. Only when the flip-flop states set forth above are obtained, is a $\overline{PS}$ or an $\overline{NS}$ pulse produced by the decoder 28 at respective output terminals 29 and 31, indicating that a valid synchronizing signal has been recognized, and also indicating the polarity of the recognized synchronizing signal. The synchronizing signal detector operation does not respond to small frequency variations in the synchronizing signal or in the clock signal.

After a positive or negative synchronizing signal has been recognized, the data detector register 24 responds to the strobe clock CL (waveform (B) of FIG. 4A) from the generator 18. This strobing of the data detector register continues as the data bits are received, with the register being reset each time a transition between the successive opposite polarity pulses of each data bit is sensed, which causes the MR signal (waveform (E) of FIG. 4A) to go low for at least one strobe bit time. The resulting output from the data detector register is shown in the curve (I) of FIG. 4A. The nor gate 36 forces a zero into the register 24 after a synchronizing signal has been recognized to delay data detection by one 8 mHz clock pulse (CL), thereby to assure proper synchronization with the received signal.

Thus, the data detector portion of the system of FIG. 3 operates in the same manner as the synchronizing detector portion, except that instead of looking at ten consecutive input strobes from the clock generator 18, the data detector register requires but two. After two consecutive strobes have been detected by the data register, the state of the input (curve (A) FIG. 4A) during the next strobe times is ignored unless the input goes through a transition. When that occurs, the MR signal (waveform (E) of FIG. 4A) goes low and the data detector register 24 is immediately reset and starts strobing the da-a. Thus, a variable "dead" time is achieved by varying the number of throw-away bits between one and two. This compensates for changes in the data rate with respect to the repetition frequency of the strobe clock from the clock generator 18.

The output from the data detector register 24 is applied as a clock to the data scorecard register 30. The scorecard register responds to the clocks, and to the +DET and −DET signals from the tri-polarity detector circuit to identify the one's and zero's in the received data and to produce output data at the output terminal 35 in response thereto. The data decoder 32 responds to the outputs from the data scorecard register 30 to produce the data clock (DCL) (curve (J) of FIG. 4A) at the output terminal 37.

The data scorecard register 30 operates in the same manner as the synchronizing signal scorecard register 26. The data scorecard register includes four flip-flops Q14, Q15, Q16 and Q17. For each binary 1 bit, each half-cycle is strobed once by the clock CL to set the flip-flops in the data scorecard register at their $\overline{Q14}$. Q15. Q16. $\overline{Q17}$ states; and for each binary 0 bit, each half-cycle is strobed once by the clock to set the flip-flops at their Q14. $\overline{Q15}$. $\overline{Q16}$. Q17 states. At the end of each data bit time, the state of the flip-flop Q17 in the data scorecard register is an indication of whether the corresponding data bit is a 0 or a 1. Therefore, the output of the flip-flop Q17 in the data scorecard register is connected to the data output terminal 35 to supply output data to that terminal.

Figure 5:
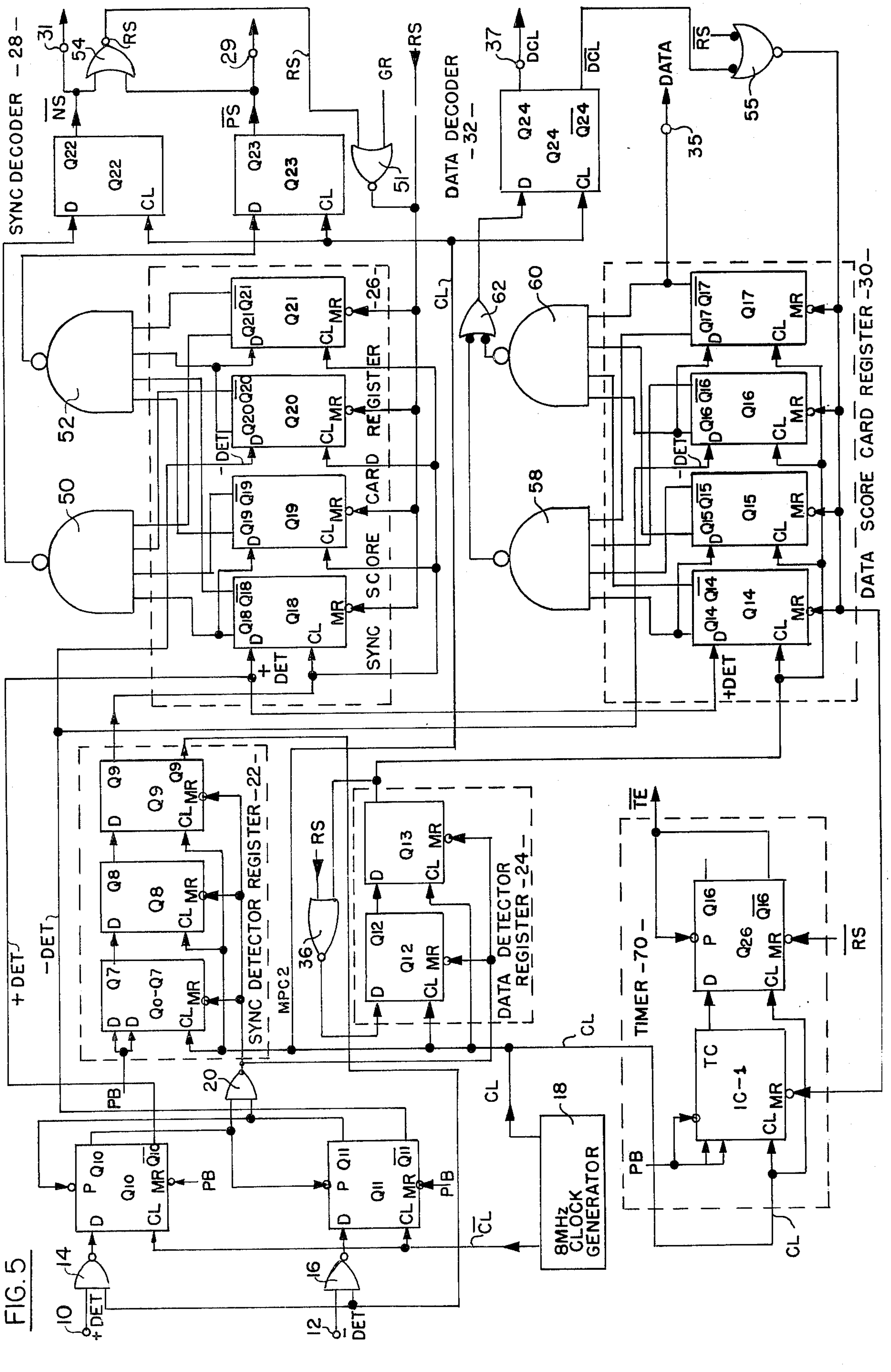
FIG. 5 is a more detailed logic block diagram of the decoding system of FIG. 3.

The system of FIG. 3 is shown in more detail in FIG. 5. As shown in FIG. 5, the synchronizing signal detector register 22 may be composed of an integrated circuit which forms the flip-flops Q0–Q7, and two additional flip-flops Q8 and Q9. The synchronizing signal scorecard register 26 may be composed of the four flip-flops Q18–Q21, connected in the illustrated manner, and whose outputs are connected, as shown, to a pair of nand gates 50 and 52. The nand gates 50 and 52 are included in the synchronizing signal decoder 28, as well as a pair of flip-flops Q22 and Q23. The gates 50 and 52 are connected respectively to the flip-flops Q22 and Q23, and these flip-flops develop the $\overline{NS}$ and $\overline{PS}$ signals at the respective output terminals 31 and 29, as the flip-flops in the synchronizing signal scorecard register assume the aforesaid states to set the flip-flops. The $\overline{NS}$ and $\overline{PS}$ signals are also applied to a nor gate 54 which develops the RS signal at its output.

The RS signal is applied to a nor gate 51 which develops the reset and clear signal for the synchronizing signal scorecard register 26. A general reset (GR) signal is also applied to the nor gate 51 to assure a reset condition in the synchronizing scorecard register 26 when the system is first energized. The RS signal from the nor gate 54 is also applied to the nor gate 36 in the data detector register 24, as explained above.

The data scorecard register 30 includes the flip-flops Q14–Q17, connected as shown, and whose outputs are connected to a pair of nand gates 58 and 60, in the illustrated manner. The outputs of the nand gates are connected through a negative or gate 62 to a flip-flop Q24, and the flip-flop develops the data clock DCL (curve (J) of FIG. 4A) at the output terminal 37. The $\overline{Q}$ output of the flip-flop Q24 is applied to a negative nor gate 55, as is the complement of the general reset signal (RS). This provides the desired reset controls for the data scorecard register 30.

The nand gate 58 develops an output whenever the data scorecard register 30 indicates, by the state of its flip-flops that a one bit has been detected in the input data; and the nand gate 60 develops an output when the state of the flip-flops in the data scorecard register 30 indicates that a zero bit has been detected. The negative or gate 62 passes both outputs to the flip-flop Q24, and it is set by the next strobe clock CL following the detection of the corresponding bit.

The reset terminals of flip-flops Q10 and Q11 are connected to a positive bias source (PB) to assure that the flip-flops will not respond to noise signals.

The system of FIG. 5 also includes a timer circuit 70 which is composed of an integrated circuit IC-1 which is connected, as shown to a flip-flop Q26. The timer circuit responds to the 8 mHz clock pulses (CL) and it is reset by the next (DCL) pulse during the data detection mode, so long as the system is properly synchronized with the received signal. If synchronization should be lost due to noise, or the like, the timer will not be reset, and an alarm signal (TE) is developed to indicate that synchronization has been lost. The IC-1 element is also connected to the positive bias source (PB) to assure that the counter will not respond to spurious noise signals.

The invention provides, therefore, an improved decoding system for binary phase modulated digital data which is relatively simple, and which does not require complex phase-locked loops or associated analog circuitry. Moreover, the decoding system of the invention is capable of operating on streams of data, and of identifying and distinguishing the synchronizing signals from the data bits, without the need for spacer bits in the input data.

While a particular embodiment of the invention has been shown and described, modifications may be made. It is intended in the claims to cover the modifications which come within the true spirit and scope of the invention.

What is claimed is:

1. A digital decoding system for recovering digital data from a binary phase modulated input signal which includes multi-bit data words and associated synchronizing signals, in which each binary bit in the data words, and each synchronizing signal, is identified by a pulse of one polarity followed by a pulse of opposite polarity, and in which the pulses forming the synchronizing signals are of different duration from the pulses forming the bits of the data words, said decoding system comprising:

input circuit means including a detector circuit for producing a first output for each pulse of one polarity in the input signal, for producing a second output for each pulse of opposite polarity in the input signal;

a strobe clock signal generator;

said detector circuit comprising a tri-state circuit, which applies a reset signal to said circuitry for detecting said synchronizing signals and for decoding the data bits of the multi-bit data words for at least one strobe clock time for each transistion of the input signal between one pulse polarity and the opposite pulse polarity; and circuitry coupled to said detector circuit and to said strobe signal generator for detecting said synchronizing signals and for decoding the data bits of the multi-bit data words associated with said synchronizing signals.

2. The digital decoding system defined in claim 1, in which said circuitry includes a synchronizing signal detector register responsive to the output of said detector circuit and to strobe pulses from said clock signal generator for producing an output pulse for each pulse forming the aforesaid synchronizing signals in the input signal.

3. The digital decoding system defined in claim 2, in which said input signal includes positive synchronizing signals each formed by a positive pulse followed by a negative pulse, and negative synchronizing signals each formed by a negative pulse followed by a positive pulse, and in which said circuitry includes network means responsive to the first and second outputs from said detector circuit and to the output pulses from said synchronizing signal detector register for producing a first output in response to a positive synchronizing signal in said input and for producing a second output in response to a negative synchronizing signal in said input.

4. The digital decoding system defined in claim 2, in which said detector circuit applies a reset signal to said synchronizing signal detector register for at least one strobe clock time for each transition of the input signal between one pulse polarity and the opposite pulse polarity.

5. The digital decoding system defined in claim 1, in which said circuitry includes a data detector register responsive to the output of said detector circuit and to strobe pulses from said clock signal generator for producing an output pulse for each pulse forming the binary bits of the data words in the input signal, and network means responsive to the first and second outputs from said detector circuit and to the output pulses from said data detector register for producing decoded data bits corresponding to the multi-bit data words of the input signal.

6. The digital decoding system defined in claim 5, in which said detector circuit applies a reset signal to said data detector register for at least one strobe clock time for each transition of the input signal between one pulse polarity and the opposite pulse polarity.

7. The digital decoding system defined in claim 5, in which said circuitry includes a decoding circuit coupled to said network means for producing a data clock signal synchronized with the data bits of the input signal.

8. The digital decoding system defined in claim 7, and which includes a timer circuit connected to said strobe clock signal generator and to the output of said decoding circuit to produce an output in the event the data clock signal beocmes missynchronized with the data bits of the input signal.

9. The digital decoding system defined in claim 3, in which said network means includes a synchronizing signal scorecard register for receiving the output pulses from the synchronizing signal detector register and the outputs from the detector circuit, and a decoding circuit coupled to said scorecard register for producing the first and second outputs of the network means.

10. The digital decoding system defined in claim 5, in which said network means includes a data scorecard register for receiving the outputs from the detector circuit and the output pulses from said data detector register.

* * * * *